United States Patent
Xie et al.

(10) Patent No.: US 10,366,548 B2
(45) Date of Patent: Jul. 30, 2019

(54) UNMANNED AERIAL VEHICLE COMMUNICATIONS METHODS AND SYSTEMS

(71) Applicant: SZ DJI TECHNOLOGY CO., LTD., Shenzhen (CN)

(72) Inventors: Peng Xie, Shenzhen (CN); Wancheng Zhou, Shenzhen (CN); Hongtao Wang, Shenzhen (CN); Tao Zhao, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 144 days.

(21) Appl. No.: 15/437,185

(22) Filed: Feb. 20, 2017

(65) Prior Publication Data

US 2017/0161968 A1    Jun. 8, 2017

Related U.S. Application Data

(63) Continuation of application No. PCT/CN2014/084958, filed on Aug. 21, 2014.

(51) Int. Cl.
*G05D 1/00* (2006.01)
*G07C 5/00* (2006.01)
(Continued)

(52) U.S. Cl.
CPC ............ *G07C 5/008* (2013.01); *B64C 39/024* (2013.01); *G05D 1/0011* (2013.01); *H04L 1/1664* (2013.01); *H04L 1/1671* (2013.01); *H04L 1/1854* (2013.01); *H04L 1/1864* (2013.01); *B64C 2201/146* (2013.01)

(58) Field of Classification Search
CPC . G07C 5/008; B64C 39/024; B64C 2201/146; G05D 1/0011; H04L 1/1664; H04L 1/1671; H04L 1/1854; H04L 1/1864
See application file for complete search history.

(56) References Cited

U.S. PATENT DOCUMENTS 9,807,569 B2 * 10/2017 Jalali .................. G01S 5/14
2017/0026898 A1 * 1/2017 Dearlove ............ H04W 40/246

FOREIGN PATENT DOCUMENTS

CN          1665195 A       9/2005
CN        101064589 A      10/2007
(Continued)

OTHER PUBLICATIONS

Nagamine, Shin, Long-Distance Remote Control of the Flying Robot Using Mobile Phone Communication Network, The Papers of Technical Meeting on "Innovative Industrial System", IEE Japan, Mar. 13, 2014, 10 Pages, Japan.
(Continued)

*Primary Examiner* — Hussein Elchanti
(74) *Attorney, Agent, or Firm* — Anova Law Group, PLLC

(57) ABSTRACT

A wireless transmission protocol for exchanging data between an unmanned aerial vehicle and a ground terminal is provided. The unmanned aerial vehicle is configured to transit image or video media data while mid-flight. The unmanned aerial vehicle and the ground terminal share a single communications channel using a time division multiple data access protocol. The unmanned aerial vehicle and the ground terminal use different communication protocols to send different types of data signals.

18 Claims, 16 Drawing Sheets

(51) Int. Cl.
*B64C 39/02* (2006.01)
*H04L 1/16* (2006.01)
*H04L 1/18* (2006.01)

(56) References Cited

FOREIGN PATENT DOCUMENTS

| | | | |
|---|---|---|---|
| CN | 101075960 | A | 11/2007 |
| CN | 101335603 | A | 12/2008 |
| CN | 102130756 | A | 7/2011 |
| CN | 102774505 | A | 11/2012 |
| CN | 103636157 | A | 3/2014 |
| JP | 05095375 | A | 4/1993 |
| JP | 08032585 | A | 2/1996 |
| JP | 2004260789 | A | 9/2004 |
| JP | 2006086611 | A | 3/2006 |
| JP | 2009212937 | A | 9/2009 |
| JP | 2009540685 | A | 11/2009 |
| JP | 2013110677 | A | 6/2013 |

OTHER PUBLICATIONS

The World Intellectual Property Organization (WIPO) International Search Report and Written Opinion for PCT/CN20141084958 dated May 22, 2015 7 Pages.

* cited by examiner

1100

| Flight Control Data 1101 | Image Data 1102 | Sensor/ACK Data (Sensor) 1103 | Flight Control Data 1101 | Image Data 1102 | Sensor/ACK Data (ACK) 1103 |
|---|---|---|---|---|---|

*FIG. 11*

UNMANNED AERIAL VEHICLE COMMUNICATIONS METHODS AND SYSTEMS

CROSS-REFERENCE TO RELATED APPLICATION

This is a continuation application of International Application No. PCT/CN2014/084958, filed on Aug. 21, 2014, the entire contents of which are incorporated herein by reference.

TECHNICAL FIELD

The disclosure relates generally to data transmission and more particularly, but not exclusively, to wireless transmission of data between an unmanned aerial vehicle and a ground terminal.

BACKGROUND

One of the many uses of unmanned aerial vehicles (UAVs) is to capture video or other images taken by cameras on the UAVs. UAVs can have on-board still or video cameras capable of taking and storing the images in on-board memory. When the UAV lands, the user can then retrieve the images from the on-board memory to view the images, either by downloading the images from a memory card or simply removing a detachable memory card. Alternatively, the UAV can transfer image data to a ground terminal while mid-flight. The ground terminal typically is coupled to a computer that can display the images on a monitor. The ground terminal alternatively can be a mobile computing device (such as a mobile phone or tablet) that displays images on the mobile computing device's screen. In this way, a user can view the UAV images at the ground terminal in real-time.

Users generally control UAVs via a handheld remote control device. The remote control device sends flight control signals to the UAV. The remote control can also send to the UAV special control signals, for example, a signal to trigger the photo-taking or video-recording function of the camera. The handheld remote device can be a standalone remote control device or can be connected to a computer or mobile computing device at a ground terminal. Sophisticated ground terminal apparatuses are capable of displaying real-time status information about the UAV, displaying images captured by the UAV, and offering additional functions such as planning a flight route.

Technical challenges arise when a user wishes for the UAV to wirelessly transmit image data while in flight. Image data transmissions demand a great deal of bandwidth. Therefore, conventional UAVs typically provide a wireless channel for the flight control signals that is separate from the wireless channel for the image signals. A wireless channel is a frequency range centered about a particular frequency. For example, the 2.4 G Wireless Fidelity protocol operates at around 2.4 Gigahertz.

One disadvantage of a two-channel system is the increased bulk and complexity of the system. Two-channel systems require two separate transmitters, an image transmission device on the UAV and a remote flight control transmission device located at the ground terminal. A two-channel system also requires two receivers, an image reception device at the ground station and a flight control reception device on the UAV. Two-channel systems may be too cumbersome for a single user to easily operate. One person may need to operate the UAV, while another controls the camera. Current methods of transmitting image and remote data through a single channel have the disadvantage of high latency because of low bandwidth limitations. The disclosed embodiments improve latency by advantageously transmitting handshaking signals (such as acknowledgment signals) selectively. That is, not every transmission uses handshaking signals.

SUMMARY

The first aspect disclosed is a method for communicating ground terminal to unmanned aerial vehicle (GT-UAV) data to an unmanned aerial vehicle (UAV) from a ground terminal, wherein the GT-UAV data is transmitted one or more times to the UAV, comprising:
receiving the GT-UAV data;
determining whether the received GT-UAV data is transmitted according to an ACK protocol; and
transmitting an acknowledgment signal to the ground terminal in response to the received GT-UAV data being determined to be transmitted according to the ACK protocol.

The method can optionally further comprise attempting to receive the GT-UAV data, and upon making an unsuccessful attempt, again attempting to receive the GT-UAV data.

The method can optionally further comprise determining a status of the UAV and transmitting the status to the ground terminal.

That status can optionally indicate whether the UAV is behaving normally or abnormally.

The method can optionally further comprise determining a status of one or more UAV functional modules and transmitting data regarding the status to the ground terminal.

That status can optionally indicate whether the UAV functional module is behaving normally or abnormally.

The method can optionally further comprise sending a command to a UAV functional module based on the GT-UAV data in response to determining that the GT-UAV data is not transmitted according to the ACK protocol.

In one embodiment of the disclosed methods, the determining comprises determining that the GT-UAV data is not sent according to an ACK protocol when the GT-UAV data is at least one of a flight control data, a takeoff assist data, a landing assist data, and a reset control data.

In one embodiment of the disclosed methods, the determining comprises determining that the GT-UAV data is sent according to an ACK protocol when the GT-UAV data is at least one of a camera setting data, a maximum flight altitude data, and a maximum flight distance data.

A second aspect disclosed is a method for communicating ground terminal-to-unmanned aerial vehicle (GT-UAV) data to an unmanned aerial vehicle (UAV) from a ground terminal, comprising:
determining whether to transmit the GT-UAV data according to an ACK protocol;
in response to determining to transmit the GT-UAV data according to an ACK protocol, transmitting the GT-UAV data one more times to the UAV according to an ACK protocol until the ground terminal receives an acknowledgment signal from the UAV; and
receiving an acknowledgment signal from the UAV in response to the GT-UAV data being sent according to the ACK protocol and being received by the UAV.

The method can optionally further comprise determining to not transmit the GT-UAV data according to an ACK protocol, and transmitting the GT-UAV data one time to the UAV.

The method can optionally further comprise receiving a status signal from the UAV indicating a status of the UAV.

That status signal can optionally indicate whether the UAV is behaving normally or abnormally.

The method can optionally further comprise receiving a status signal from the UAV indicating a status of a UAV functional module.

That status signal can optionally indicate whether the UAV functional module is behaving normally or abnormally.

The method can optionally further comprise sending the GT-UAV data not according to an ACK protocol when the GT-UAV data is at least one of a flight control data, a takeoff assist data, a landing assist data, and a reset control data.

The method can optionally further comprise sending the GT-UAV data according to an ACK protocol when the GT-UAV data is at least one of a camera setting data, a maximum flight altitude data, and a maximum flight distance data.

The third aspect disclosed is an unmanned aerial vehicle, comprising:

a transceiver capable of receiving ground terminal to unmanned aerial vehicle (GT-UAV) data from a ground terminal;

a processing system coupled to the transceiver for determining whether the GT-UAV data transmission is sent according to an ACK protocol and for generating an acknowledgment signal; and wherein the ACK protocol comprises the ground terminal transmitting GT-UAV data according to the ACK protocol one or more times until the transceiver successfully receives the GT-UAV data, the processing system determining whether the GT-UAV data is sent according to the ACK protocol, and the transceiver transmitting an acknowledgment signal to the ground terminal in response to the GT-UAV data being sent according to the ACK protocol.

The processing system is optionally further capable of creating status information about a functional module and the transceiver further capable of transmitting that status information to the ground terminal.

The transceiver is optionally further capable of receiving from the ground terminal a command signal for controlling a functional module and the processing system further capable of interpreting that command signal.

The unmanned aerial vehicle can optionally comprise a camera for recording images in response to instructions from the processing system, and wherein the transceiver is further capable of transmitting unmanned aerial vehicle to ground terminal (UAV-GT) data with an image created by the camera.

The unmanned aerial vehicle can optionally comprise a sensor for making a measurement in response to an instruction from the processing system, and wherein the transceiver is further capable of transmitting at regular intervals unmanned aerial vehicle to ground terminal (UAV-GT) data with measurement data created by the sensor.

A fourth aspect disclosed is a ground terminal, comprising:

a transceiver capable of transmitting ground terminal to unmanned aerial vehicle (GT-UAV) data to an unmanned aerial vehicle (UAV);

a processing system coupled to the transceiver for determining whether the GT-UAV data is sent according to an ACK protocol and for analyzing an acknowledgment signal; and wherein the ACK protocol comprises the transceiver transmitting GT-UAV data according to the ACK protocol one or more times until the transceiver receives an acknowledgment signal generated by the UAV in response to the UAV determining that the GT-UAV data is sent according to the ACK protocol, and the UAV transmitting the acknowledgment signal to the ground terminal.

The processing system is optionally further capable of determining to not send the GT-UAV data according to an ACK protocol.

The transceiver is optionally further capable of receiving sensor data about the status of the UAV and the processing system further capable of analyzing that sensor data.

The transceiver is optionally further capable of receiving data about the status of a functional module of the UAV.

BRIEF DESCRIPTION OF THE DRAWINGS

FIG. 11 is an exemplary timeline illustrating an embodiment of a series of data transmissions in accordance with an ACK protocol.

Figure 1:
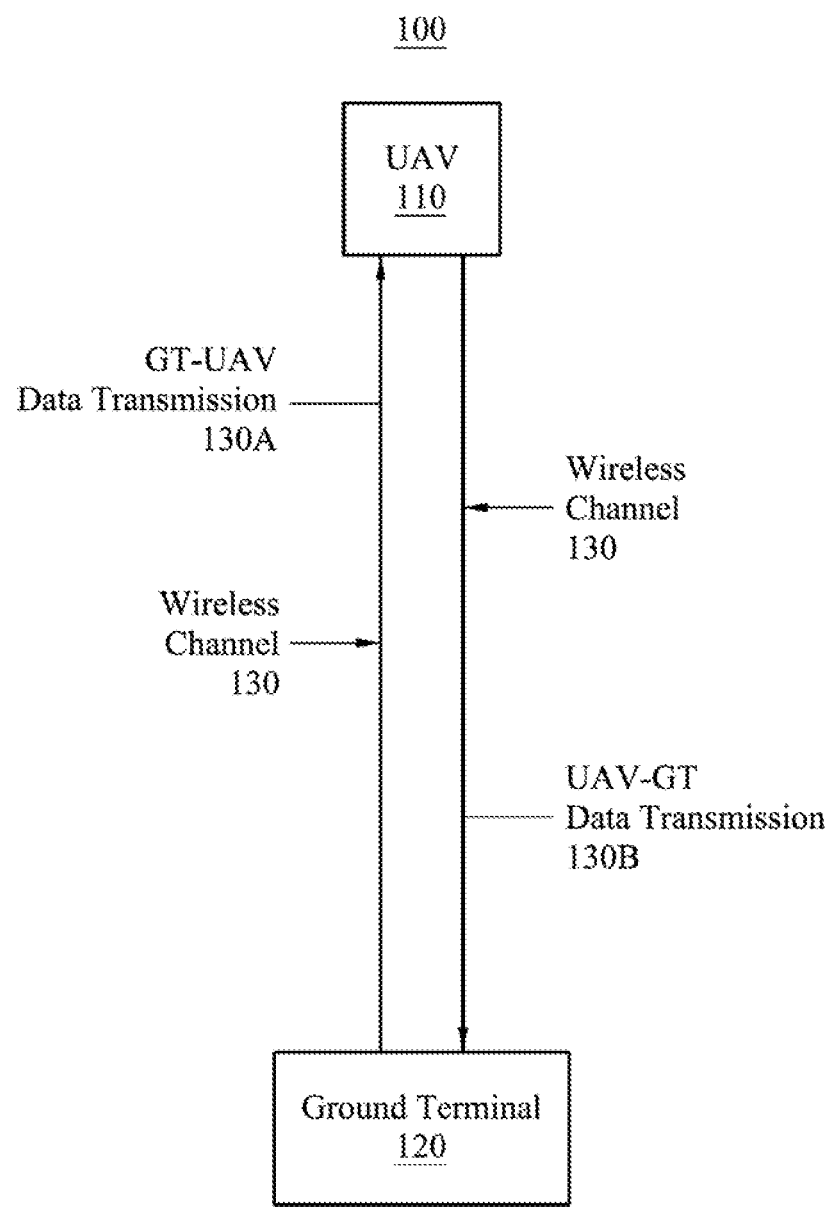
FIG. 1 is an exemplary top-level block diagram illustrating an embodiment of an Unmanned Aerial Vehicle (UAV) system for enabling a UAV to communicate with a ground terminal.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

Since currently-available two-channel communication systems require two separate transmitters and suffer from increased bulk and complexity, a communication system that utilizes a single wireless channel for selectively transmitting both image and the flight control signals according to more than one transmission protocol can prove desirable and provide a basis for a wide range of system applications, such as Unmanned Aerial Vehicle (UAV) systems. This result can be achieved, according to one embodiment disclosed herein, by a UAV system 100 as illustrated in FIG. 1.

Turning to FIG. 1, the UAV system 100 is illustrated as including a UAV 110 and a ground terminal 120. In some embodiments, the UAV 110 and the ground terminal 120 can communicate with each other via an exchange of one or more wireless transmission signals. The UAV 110, for example, can transmit a UAV to ground terminal (UAV-GT) data transmission 130B to the ground terminal 120. Conversely, the ground terminal 120 can transmit a ground terminal to UAV (GT-UAV) data transmission 130A to the UAV 110. When the UAV 110 is in flight, the transmission signals exchanged between the UAV 110 and the ground terminal 120 typically are wireless signals.

In some embodiments, the UAV system 100 is a single-channel system. A wireless channel is a frequency range centered about a particular frequency. In some embodiments, both a GT-UAV data transmission 130A and a UAV-GT data transmission 130B use the same wireless channel 130. Hence the UAV 110 and ground terminal 120 share a single wireless channel 130.

Figure 2:
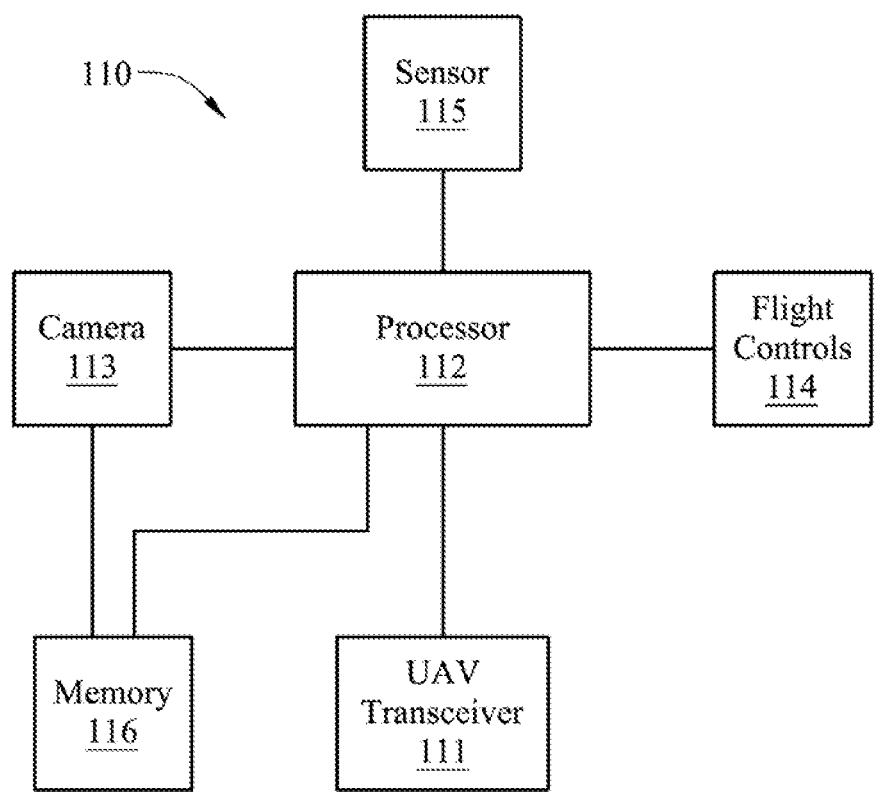
FIG. 2 is an exemplary block diagram illustrating an embodiment of the UAV of FIG. 1.

FIG. 2 is an exemplary block diagram illustrating an embodiment of the UAV 110. As shown in FIG. 2, the UAV 110 (shown in FIG. 1) can include a UAV transceiver 111. UAV transceiver 111 can comprise any suitable type of conventional transceiver of any suitable speed and/or size and is capable of both sending and receiving wireless signals along the wireless channel 130. The UAV 110 advantageously can include one or more additional UAV components, and the UAV transceiver 111 can be configured to communicate with at least one of the additional components of the UAV 110. The number and configuration of the UAV components can be determined, for example, based upon a selected application for the UAV 110.

The UAV 110, for example, can include a UAV processor 112 that is coupled to the UAV transceiver 111. The UAV processor 112 can receive and analyze the GT-UAV data transmission 130A (shown in FIG. 1) received by the UAV transceiver 111. Additionally, the UAV processor 112 can send data to the UAV transceiver 111 to be sent as a UAV-GT data transmission 130B (shown in FIG. 1) to the ground terminal 120 (shown in FIG. 1). The UAV transceiver 111 can modulate computer-readable signals from the UAV processor 112 to wireless signals for transmission to the ground terminal 120. Similarly, the UAV transceiver 111 can demodulate wireless signals received from the ground terminal 120 into machine-readable signals capable of being read by the UAV processor 112. The UAV processor 112 can comprise any type of processing system, such as one or more microprocessors (µPs), Field Programming Gate Arrays (FPGAs), central processing units (CPUs) and/or digital signal processors (DSPs) of any kind.

A UAV 110 can further include a camera 113. The camera 113 can be pre-installed as part of the assembled UAV 110. Alternatively, the UAV 110 can contain a camera holder/pan-tilt device (not pictured) for mounting and/or stabilizing the camera 113. The camera 113 can capture images for use in still photography and/or video. The camera 113 can also be used to provide all or part of the image for processor 112 to analyze obstacles and guide the UAV 110 to the right flight route to keep safe. In some embodiments, the camera 113 is coupled to the UAV processor 112. The UAV processor 112 can control the operation of the pan/tilt device that carries the camera 113, for example, by changing the camera 113 position and/or directing the camera 113 to capture an image.

A UAV 110 can further comprise flight controls 114. Flight controls 114 are the mechanical components of the UAV 110 that control propulsion for the UAV 110 in order to control the pitch, roll, and yaw of the UAV 110. Flight controls 114 can alter the speed and/or position of the UAV 110. In some embodiments, the flight controls 114 are coupled to the UAV processor 112. The ground terminal 120 can transmit a GT-UAV data transmission 130A containing data of the user-defined route plan. The UAV transceiver 111 receives the GT-UAV data transmission 130A and conveys it to the UAV processor 112. The UAV processor 112 then interprets the flight control data and sends an appropriate instruction or set of instructions to the flight controls 114. The flight controls 114 can then alter the speed or position of the UAV 110.

A UAV 110 can further include a sensor 115. The sensor 115 can comprise multiple sensors each for making at least one selected type of measurement. The types of measurements made by a first sensor 115 of the UAV 110 can be the same as and/or different from the types of measurements made by a second sensor 115. For example, a selected sensor 115 can measure the speed, altitude, and/or position of the UAV 110. Sensor 115 can comprise a global positioning satellite sensor, accelerometer, barometer, ultrasonic wave detector, etc. In some embodiments, the UAV processor 112 is coupled to each sensor 115 and capable of analyzing the measurements provided by the sensors 115. The UAV processor 112 can also transmit measurements from the sensor 115 by directing the UAV transceiver 111 to transmit to a ground terminal 120 a UAV-GT data transmission 130B having measurements taken from the sensor 115. Using data provided by the sensor 115, the UAV processor 112 or ground terminal 120 can determine whether the status of the UAV 110 is normal or abnormal. For example, the status of the UAV 110 may be abnormal if its battery life falls below a certain threshold, it deviates from a flight path, or its altitude rises above a certain value. There are many possible criteria for determining whether the UAV 110 is behaving normally or abnormally. Using these criteria, the UAV processor 112 can determine that the UAV 110 is behaving abnormally and transmit a signal to the ground terminal 120 to alert the ground terminal 120 that the UAV 110 is behaving abnormally.

The UAV 110 can further include UAV memory 116. In some embodiments, the UAV memory 116 is coupled to the UAV processor 112. The UAV memory 116 can be used to store instructions that the UAV processor 112 reads and executes. The camera 113 can also be coupled to UAV memory 116. The camera 113 can store image data in the UAV memory 116. The UAV 110 can transmit images to the ground terminal 120 in the following manner. The processor 112 retrieves the image from the UAV memory 116 or the camera 113. The UAV processor 112 then modulates and sends that image to the UAV transceiver 111, which then transmits a UAV-GT data transmission 130B having the image to the ground terminal 120.

The UAV memory 116 can comprise multiple hardware memory devices. For example, the camera 113 and the UAV processor 112 can each have a dedicated memory device. The UAV memory 116 can comprise a non-volatile memory system. In some embodiments, the UAV memory 116 can comprise any suitable type of memory system, such as any electronic, magnetic, and/or optical storage media, without limitation. Exemplary storage media can include one or more static random access memories (SRAMs), dynamic random access memories (DRAMs), electrically-erasable programmable read-only memories (EEPROMs), FLASH memories, or hard drives. A first UAV memory device associated with a first UAV component may be the same as and/or different from a second UAV memory device associated with a second UAV component. Alternatively and/or additionally, the first UAV memory device can be separate from, and/or at least partially integrated with, the second UAV memory device.

The UAV 110 can be divided, logically or physically, into one or more functional modules for performing specialized tasks. A functional module can comprise one or more components of the UAV 110. For example, a functional module for measuring atmospheric pressure can comprise software in the processor 112 and a barometer in the sensor 115, as well as the UAV transceiver 111 for transmitting atmospheric pressure data to the ground terminal 120. A functional module can alert the UAV 110 or the ground terminal 120 or both that the UAV 110 is behaving abnormally. For instance, a functional module for measuring altitude could sense a rapid decrease in altitude. The functional module could then alert the UAV processor 112 of the abnormal decrease in altitude. Additionally, the UAV 110 can transmit data regarding a functional module to the ground terminal 120. Therefore, the ground terminal 120 may receive status information about a functional module to determine if the UAV 110, or a particular functional module, is behaving normally or abnormally. Additionally, the ground terminal 120 can transmit a GT-UAV transmission 130A with commands for controlling a functional module, for example, requesting status information from the functional module.

Figure 3:
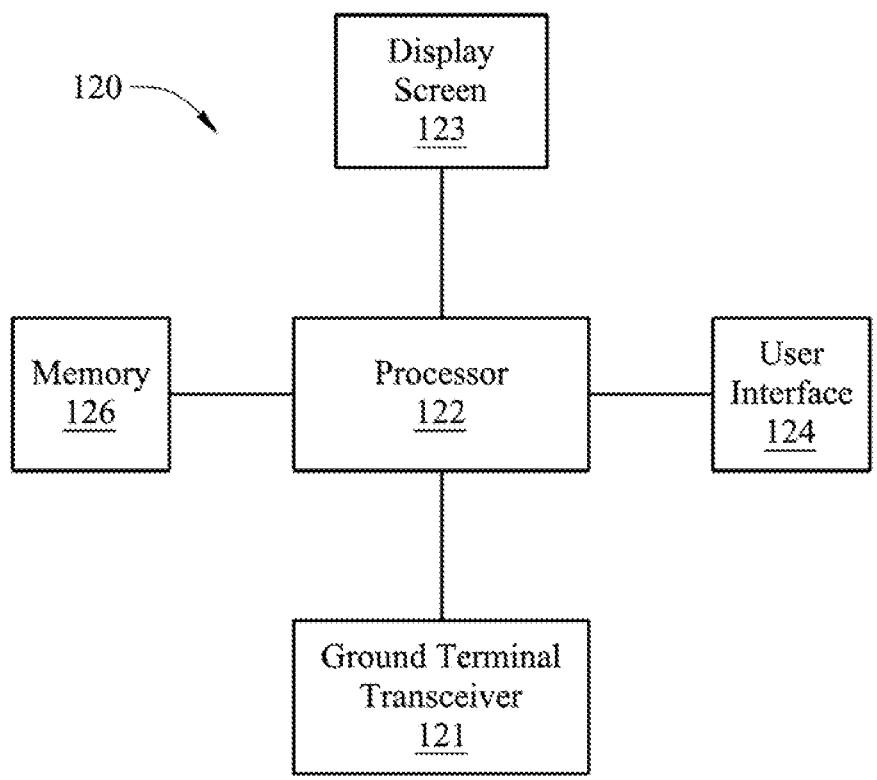
FIG. 3 is an exemplary block diagram illustrating an embodiment of the ground terminal of FIG. 1.

FIG. 3 is an exemplary block diagram illustrating an embodiment a ground terminal 120 (shown in FIG. 1). As shown in FIG. 3, the ground terminal 120 can include a ground terminal transceiver 121. Ground terminal transceiver 121 can comprise any suitable type of conventional transceiver of any suitable speed and/or size and is capable of both sending and receiving wireless signals along the wireless channel 130. The ground terminal 120 advantageously can include one or more additional ground terminal components, and the ground terminal transceiver 121 can be configured to communicate with at least one of the additional components of the ground terminal 120. The number and configuration of the ground terminal components can be determined, for example, based upon a selected application for the UAV 110 (shown in FIG. 1) or the ground terminal 120.

The ground terminal 120, for example, can include a ground terminal processor 122 that is coupled to the ground terminal transceiver 121. The ground terminal processor 122 can receive and analyze the UAV-GT data transmission 130B received by the ground terminal transceiver 121. Additionally, the ground terminal processor 122 can send data to the ground terminal transceiver 121 to be sent as a GT-UAV data transmission 130A to the UAV terminal 110 (shown in FIG. 1). The ground terminal transceiver 121 can modulate signals from the ground terminal processor 122 to wireless signals for transmission to the UAV 110. Similarly, the ground terminal transceiver 121 can demodulate wireless signals received from the UAV 110 into machine-readable signals capable of being read by the ground terminal processor 121. The ground terminal processor 122 can comprise any type of processing system, such as one or more microprocessors (μPs), Field Programmable Gate Arrays (FPGAs), central processing units (CPUs) and/or digital signal processors (DSPs) of any kind.

A ground terminal 120 can further include a display screen 123. The display screen 123 can comprise any type of display screen, including cathode ray tube (CRT), liquid crystal display (LCD), Thin Film Transistor (TFT) Screen, plasma, etc. In some embodiments, the display screen 123 can present On Screen Display (OSD) information to a viewer that describes the status of the UAV 110. For example, the display screen 123 can display one or more of the altitude, speed, position, etc. of the UAV 110. The UAV processor 112 can transmit measurements from the sensor 115 by directing the UAV transceiver 111 to transmit to the ground terminal 120 a UAV-GT data transmission 130B with measurements. The ground terminal transceiver 121 then conveys those measurements to the ground terminal processor 122, which instructs the display screen 123 coupled to the ground terminal 120 to display the measurements.

In some embodiments, the display screen 123 can display images taken by the camera 113. The UAV processor 112 can transmit images from the camera 113 or the UAV memory 116 by directing the UAV transceiver 111 to transmit to a ground terminal 120 a UAV-GT transmission signal 130B having an image. The ground terminal transceiver 121 then conveys that image to the ground terminal processor 122, which then directs the display screen 123 to display the image.

The ground terminal 120 can further include a graphical user interface (GUI) 124. The GUI 124 can comprise one or more pushbuttons, such as a keyboard or a keypad, and/or a pointing device, such as a mouse, trackball, joystick, or stylus. The GUI 124 receives flight commands defined by the operator and transfers those flight commands to the ground terminal processor 122. The ground terminal processor 122 can interpret those flight commands and send the flight commands to the ground terminal transceiver 121, which can transmit a GT-UAV data transmission 130A with those flight commands. The UAV transceiver 111 receives the GT-UAV data transmission 130A with those flight commands and conveys those flight commands to the UAV processor 112. The UAV processor 112 then interprets those flight commands and sends them to the flight controls 114, which proceed to control the flight behavior of the UAV 110.

The ground terminal 120 can further include a ground terminal memory 126. The ground terminal memory 126 can comprise a non-volatile memory system. In some embodiments, the ground terminal memory 126 can comprise any suitable type of memory system, such as any electronic, magnetic, and/or optical storage media, without limitation. Exemplary storage media can include one or more static random access memories (SRAMs), dynamic random access memories (DRAMs), electrically-erasable programmable read-only memories (EEPROMs), FLASH memories, or hard drives (HDDs). In some embodiments, the ground terminal memory 126 is coupled to the ground terminal processor 122. In some embodiments, the ground terminal processor 122 uses the ground terminal memory 126 to store instructions that the ground terminal processor 122 reads and executes. A first ground terminal memory device associated with a first ground terminal component can be the same as and/or different from a second ground terminal memory device associated with a second ground terminal component. Alternatively, and/or additionally, the first ground terminal memory device can be separate from, and/or at least partially integrated with, the second ground terminal memory device.

The ground terminal 120 illustrated in FIG. 3 can comprise a laptop computer, desktop computer, portable telephone, personal digital assistant, or any other similar computing device.

Figure 4:
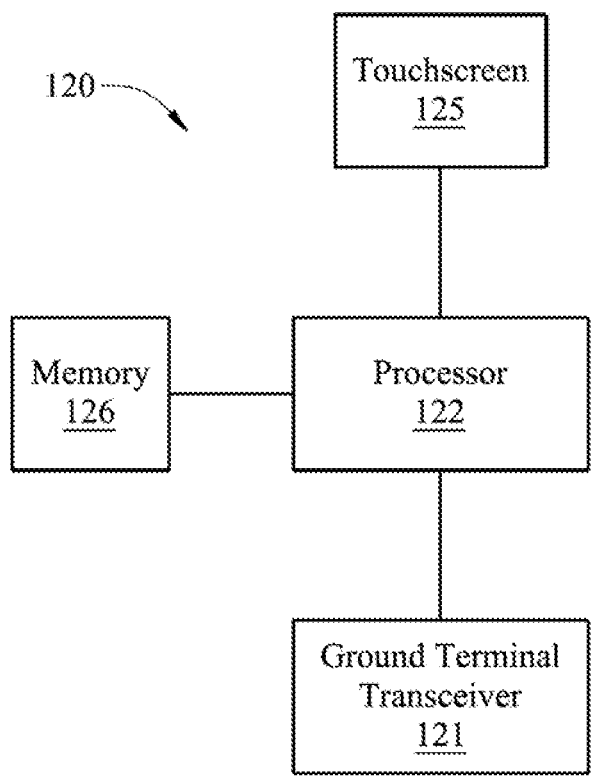
FIG. 4 is an exemplary block diagram illustrating an alternative embodiment of the ground terminal of FIG. 1.

In an alternative embodiment, as illustrated in FIG. 4, the ground terminal 120 (shown in FIG. 1) can feature a touch screen 125. The touch screen 125 can be capable of both displaying information to a user, as well as receiving input commands from the user. A conventional touch screen of suitable size can be used as the touch screen 125. The ground terminal 120 illustrated in FIG. 4 can comprise a tablet computer, all-in-one computer, laptop computer, portable telephone, personal digital assistant, or any other similar computing device featuring a touchscreen.

Figure 5:
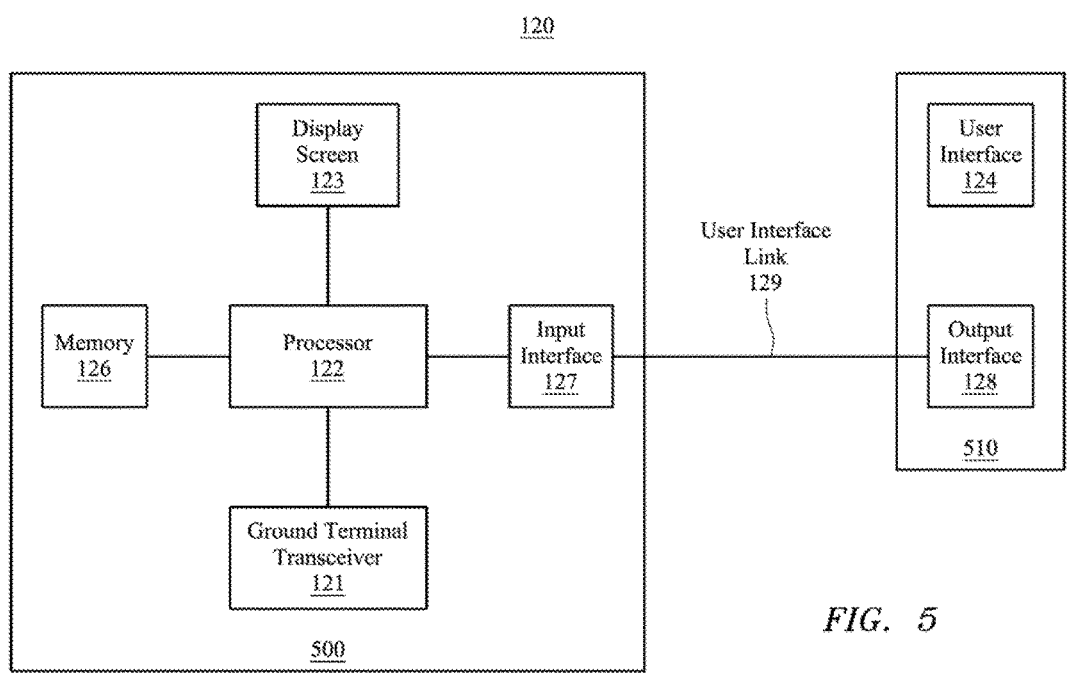
FIG. 5 is an exemplary block diagram illustrating another alternative embodiment of the ground terminal of FIG. 1.

In another alternative embodiment, as illustrated in FIG. 5, the ground terminal 120 (shown in FIG. 1) comprises two separate devices, a ground terminal station 500 and a ground terminal remote control 510. The ground terminal station 500 comprises a ground terminal transceiver 121, a ground terminal processor 122, a display screen 123, a ground terminal memory 126, and an input interface 127. The input interface 127 receives inputs from an external device, and conveys those inputs to the ground terminal processor 122. Flight control commands are an example of inputs the input interface 127 can receive. The input interface 127 can consist of a conventional input/output device, for example, a USB-compatible interface.

The ground terminal remote control 510 comprises a GUI 124 and an output interface 128. The GUI 124 can comprise one or more pushbuttons, such as a keyboard or a keypad, and/or a pointing device, such as a mouse, trackball, joystick, or stylus. The GUI 124 receives flight commands and transfers those flight commands to the output interface 128. The output interface 128 can consist of a conventional input/output device. The output interface 128 transmits those flight commands along a user interface link 129 to the input interface 127. The user interface link 129 can comprise any suitable communications link, such as a metallic wire. The user interface link 129 can also be a wireless link. In that case, the output interface 128 and input interface 127 would be capable of receiving and transmitting wireless signals, for example, Bluetooth signals, Wireless Fidelity (Wi-Fi) signals, etc.

Figure 6:
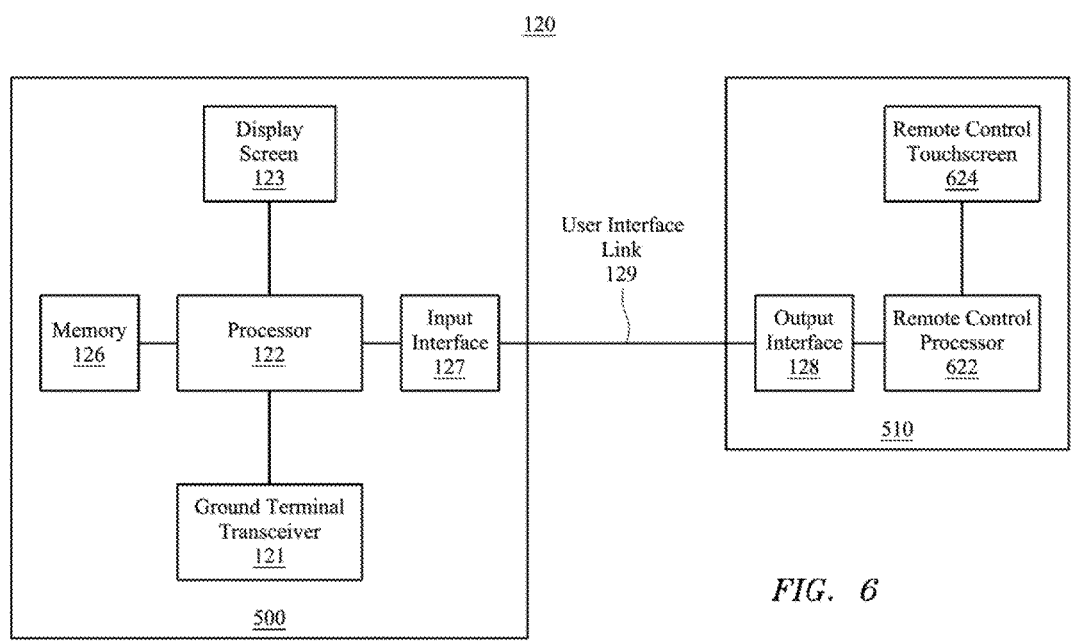
FIG. 6 is an exemplary block diagram illustrating another alternative embodiment of the ground terminal of FIG. 1.

In an another alternative embodiment, illustrated in FIG. 6, the ground terminal remote control 510 comprises a remote control touch screen 624. The remote control touch screen 624 is capable of both displaying information to a user, as well as receiving input commands from the user. A conventional touch screen of suitable size can be used as the remote control touch screen 624. In some embodiments, the remote control touch screen 624 is coupled to a remote control processor 622. The remote control processor 622 analyzes the inputs from the remote control touch rests 624 and displays a graphical user interface on the remote control touch screen 624. Upon receiving flight control inputs from the remote control touch screen 624, the remote control processor 622 then conveys those flight control inputs to the output interface 128. The ground terminal station 500 comprises an input interface 127. The output interface 128 conveys flight control inputs to the input interface 127 via a user link interface 129.

The GT-UAV data transmission 130A (shown in FIG. 1) can comprise flight control signals. If a user wishes to increase the speed or the altitude of the UAV 110, for example, the ground terminal 120 can transmit a GT-UAV data transmission 130A directing the UAV 110 to change its speed or altitude.

The GT-UAV data transmission 130A can also comprise a special control signal. A UAV 110 can include an automatic take off feature. The GT-UAV data transmission 130A can comprise an automatic take off signal directing the UAV 110 to take off automatically. A UAV 110 can include a landing assistant feature. The GT-UAV data transmission 130A can direct the UAV 110 to engage or disengage the landing assistant feature. The GT-UAV data transmission 130A can comprise reset control data to direct the UAV 110 to recalibrate its GPS home point. The GT-UAV data transmission 130A can comprise a signal to direct the UAV 110 to update the GPS home point to the user's location.

The GT-UAV data transmission 130A can also control the operation of the UAV camera 113. For example, the GT-UAV data transmission 130A can comprise camera configuration controls to configure the camera 113. The GT-UAV data transmission 130A can also comprise camera controls and/or settings, such as a command for the camera 113 to take a photograph or record a video. If the UAV 110 contains a gimbal, then the GT-UAV data transmission 130A can also be directed to the use and control of the gimbal.

The UAV-GT data transmission 130B (shown in FIG. 1) can comprise image data from the camera 113 the UAV 110 sends to the ground terminal 120. Additionally, the sensor 115 can generate sensor data. The UAV 110 can transmit a UAV-GT data transmission 130B with this sensor data to the ground terminal 120. This allows the ground terminal 120 to receive important feedback from the UAV 110. Sensor data can include altitude, attitude, battery power, velocity, and some emergency status signals (such as a low-battery warning or loss of GPS signal). The UAV-GT data transmission 130B can also include status or command signals, as will be described later.

These examples are not meant to be exhaustive. Other signal types may comprise the GT-UAV data transmission 130A and the UAV-GT data transmission 130B.

In some embodiments, the UAV 110 and the ground terminal 120 transmit signals over the same wireless channel 130 (shown in FIG. 1). In some embodiments, the UAV 110 and the ground terminal 120 use a coding method to ensure that the UAV 110 and the ground terminal 120 properly share the wireless channel 130. In some embodiments, the UAV 110 and the ground terminal 120 use time division multiple access to share the channel. Under a time division multiple access protocol, the transmission time is divided into time frames. Time frames are, in turn, divided into time slots, with each time frame comprising multiple time slots. Time division multiple access generally consists of assigning certain time slots within the channel for the UAV transceiver 111 to use, and certain time slots within the channel for the ground terminal transceiver 121 to use. A given time slot cannot be assigned to both the UAV transceiver 111 and the ground terminal transceiver 121.

Figure 7:
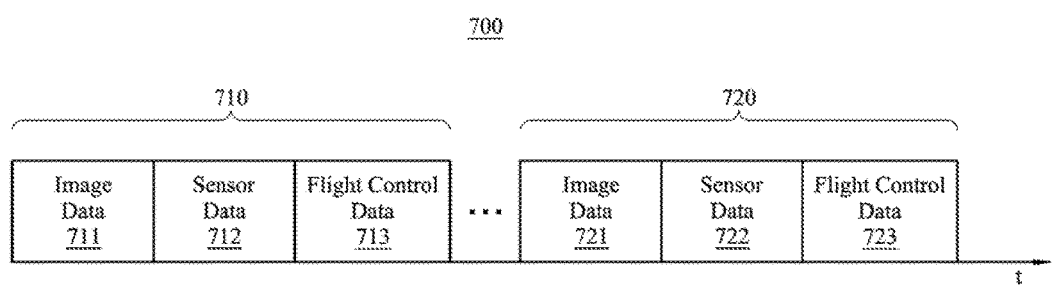
FIG. 7 is an exemplary timeline illustrating an embodiment of a series of time multiple access protocol data transmissions between the UAV and ground terminal of FIG. 1.

FIG. 7 illustrates the operation of an exemplary time division multiple access protocol 700. In FIG. 7, the UAV 110 (shown in FIG. 1) and the ground terminal 120 (shown in FIG. 1) exchange transmission signals along the same wireless channel 130 (shown in FIG. 1). FIG. 7 shows two different time frames: a first time frame 710; and a second time frame 720. The first frame 710 occurs earlier in time than the second time frame 720. Both first time frame 710 and second time frame 720 are divided into three time slots. First time frame 710 is divided into are is age data slot 711, a sensor data slot 712, and a flight control data slot 713. Second time frame 720 is divided into an image data slot 721, a sensor data slot 722, and a flight control data slot 723. In this example, first time frame 710 and second time frame 720 are each divided into three time slots, but it is possible to divide each time frame into any suitable number of time slots, depending, for example, on the number of signals used by the UAV system 100 (shown in FIG. 1) and how frequently those signals need to be exchanged. For example, one or more time slots can be provided for special control signals. Additionally, time frames 710, 720 can contain differing numbers of time slots.

The UAV 110 and the ground terminal 120 use certain of the time slots 711-713, 721-723 to transmit either a GT-UAV data transmission 130A (shown in FIG. 1) or a UAV-GT data transmission 130B (shown in FIG. 1). The UAV 110 can transmit a first UAV-GT data transmission 130B with image data during the first time frame image data slot 711 and a second UAV-GT data transmission 130B with additional image data during the second time frame image data slot 721. The UAV 110 can transmit a UAV-GT data transmission 130B with sensor data during the first time frame sensor data slot 712 and the second time frame sensor data slot 722. The ground terminal 120 can transmit a GT-UAV data transmission 130A with flight control data during the first time frame flight control data slot 713 and second frame flight control data slot 723.

FIG. 7 represents the time slots 711-713 and 721-723 as being adjacent to each other. In some embodiments, the time slots within a time frame include buffer time between the time slots. For example, within first time frame 710, there may be buffer time between the image data slot 711 and the sensor data slot 712. There may also be buffer time between first time slot sensor data slot 712 and first time slot control data slot 713.

Time division multiple access protocol 700 is a static time division multiple access protocol. In a static time division multiple access protocol, the UAV 110 and the ground terminal 120 are assigned time slots, regardless of whether the UAV 110 or the ground terminal 120 has an appropriate signal to send during that time slot. For example, first time frame image data slot 711 is reserved for the UAV 110 to transmit a UAV-GT data transmission 130B having an image. But it is possible that during the time period corresponding to first time frame image data slot 711, the UAV 110 has no image to transmit.

Figure 8A:
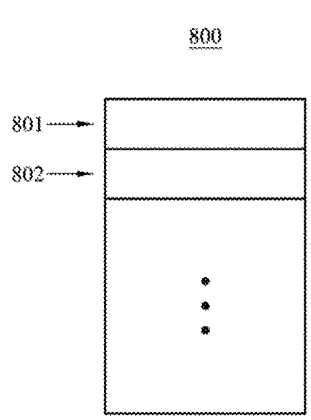
FIGS. 8a, 8b, and 8c are exemplary buffer devices illustrating respective embodiments of a dynamic request buffer for use with the dynamic multiple access protocol of FIG. 9.
Figure 8B:
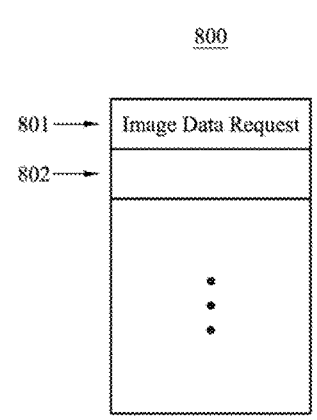
Figure 8C:
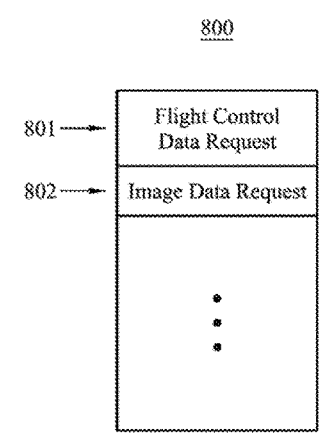

An alternative embodiment of the UAV system 100 uses a dynamic time division multiple access protocol. In this embodiment, the UAV system 100 has a dynamic request buffer 800, as illustrated in FIGS. 8*a*-8*c*. FIG. 8*a*, for example, shows an empty dynamic request buffer 800, meaning that neither the UAV 110 (shown in FIG. 1) nor the ground terminal 120 (shown in FIG. 1) seeks to transmit any data through the wireless channel 130 (shown in FIG. 1). FIG. 8*b* illustrates a dynamic request buffer 800 when the UAV 110 (shown in FIG. 1) wishes to transmit image data through the wireless channel 130 (shown in FIG. 1). Entry one 801 of the dynamic request buffer 800 contains a request to transmit, a UAV-GT data transmission 130B (shown in FIG. 1) with image data.

FIG. 8*c* illustrates a dynamic request buffer 800 when a UAV 110 (shown in FIG. 1) seeks to transmit a UAV-GT data transmission 130B (shown in FIG. 1) with image data, and the ground terminal 120 (shown in FIG. 1) seeks to transmit the GT-UAV data transmission 130A (shown in FIG. 1) with flight control data. In some embodiments, each type of signal has a priority level. Signals with higher priority levels are transmitted first. In this example, flight control data has a higher priority level than image data. Therefore, if the dynamic request buffer 800 contains both a request to transmit flight control data and a request to transmit image data, the request to transmit flight control data has higher priority. Priority is represented by the entries in the dynamic request buffer 800. The top entry, entry one 801, contains the highest priority transmission request. Entry two 802 contains the second-highest priority transmission request. In this example, therefore, the flight control data transmission request is placed in first entry 801, while the image data request is placed in second entry 802. In some embodiments, the dynamic request buffer 800 contains enough entries to accommodate every transmission request.

The dynamic request buffer 800 can be located at the UAV memory 116 (shown in FIG. 2) or the ground terminal memory 126 (shown in FIG. 3) or both. The dynamic request buffer 800 can be a stand-alone memory device, or can be a partition within a larger memory structure. If the dynamic request buffer 800 is located within the UAV memory 116, the UAV processor 112 (shown in FIG. 2) can control the dynamic request buffer 800. If the dynamic request buffer 800 is located within the ground terminal memory 126, the ground terminal processor 122 (shown in FIG. 3) can control the dynamic request buffer 800.

Figure 9:
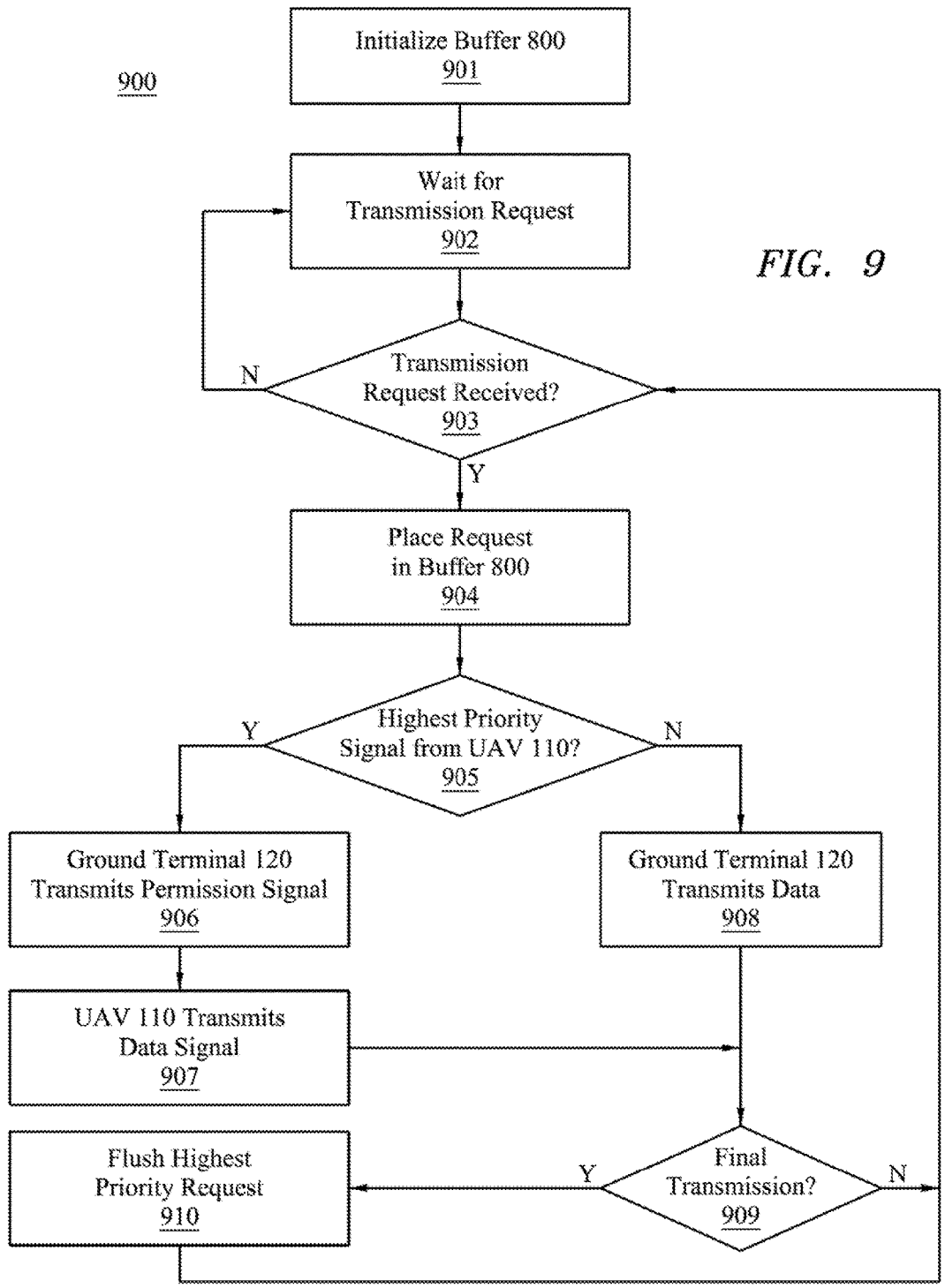
FIG. 9 is an exemplary flow chart illustrating an embodiment of a method for implementing a dynamic time multiple access protocol.

FIG. 9 illustrates a method 900 of operation of a dynamic time division multiple access protocol. In this example, the ground terminal processor 122 (shown in FIG. 3) controls the dynamic request buffer 800 (shown in FIG. 8). At 901, dynamic request buffer 800 is initialized. The ground terminal processor 122 waits, at 902, until a component on either the UAV 110 (shown in FIG. 1) or the ground terminal 120 (shown in FIG. 1) seeks to transmit a signal through the wireless channel 130 (shown in FIG. 1).

A determination of whether the ground terminal processor 122 has received one or more requests to transmit data through the wireless channel 130 is made, at 903. The requests may arrive from a component within the ground terminal 120 and/or the ground terminal processor 122. Alternatively and/or additionally, the requests may arrive from the UAV 110 if a component of the UAV 110 seeks to transmit data through the wireless channel 130.

If the ground terminal processor 122 has received one or requests to transmit data through the wireless channel 130, the ground terminal processor 122 places a transmission request in the dynamic request buffer 800. The ground terminal processor 122 places the request in the dynamic request buffer 800 in order of priority in the manner discussed in more detail above with reference to FIG. 8. Namely, the highest priority request is placed in the top or front of the dynamic request buffer 800. The request is placed in the dynamic request buffer 800, at 904, in order of priority.

Block 905 represents the condition of whether the highest priority request in the dynamic request buffer 800 corresponds to a signal to be transmitted from the UAV 110 to the ground terminal 120. That is, whether the highest priority request is for a UAV-GT data transmission 130B. This may be performed, for example, by reserving a status bit within the transmission request to indicate whether the transmission is to occur from the UAV 110 or the ground terminal 120.

If the highest priority request in the dynamic request buffer 800 corresponds to a signal to be transmitted from the UAV 110 to the ground terminal 120, that is, a UAV-GT data transmission 130B, then the around terminal 120 transmits a short permission signal through the wireless channel 130 to the UAV 110, alerting the UAV 110 that the UAV 110 has permission to begin transmitting a UAV-GT data transmission 1308 corresponding to its highest priority request. In block 906 the ground terminal 120 transmits a permission signal through the wireless channel 130 giving the UAV 110 permission transmit the UAV-GT data transmission 130B. Upon receiving the permission signal, the UAV 110 transmits the UAV-GT data transmission 130B corresponding to the high priority request, represented by block 907.

If the condition in block 905 is not satisfied, meaning that the highest priority request in the dynamic request buffer 800 corresponds to a GT-UAV data transmission 130A, the ground terminal 120 begins transmitting the GT-UAV data transmission 130A, represented by block 908.

The transmission of the GT-UAV data transmission 130A or the UAV-GT data transmission 130B is not necessarily a complete transfer of the data to be transmitted, however. The transmission represented by block 907 and block 908 corresponds to one time slot in a time frame. But some signals require more than one time slot to be completely transmitted. Therefore, after the transmission represented by either block 907 or block 908 occurs, the ground terminal processor 122 determines whether the transmission represented by block 907 or block 908 was the final transmission corresponding to the highest priority request. The requested data transfer can be encoded with an end code that the ground terminal processor 122 recognizes as indicating that the signal is finished transmitting. Block 909 represents the condition of whether the transmission represented by block 907 or block 908 was the final transmission for the highest priority request.

If the condition of block 909 is false and the transmission represented by block 907 or block 908 was not the final transmission of the highest priority request, then the ground terminal processor 122 again checks to determine whether any new transmission requests have arrived. That is, the ground terminal again executes the procedure represented by block 903.

If the condition of block 909 is true and the transmission represented by block 907 or block 908 was the final transmission for the highest priority request, the highest priority request is flushed from entry one 801 (shown in FIG. 8) of the dynamic request buffer 800 (shown in FIG. 8). Block 910 represents flushing the highest priority request from entry one 801 of the dynamic request buffer 800. The ground terminal processor 122 also determines whether the ground terminal processor 122 has received any new transmission requests, that is, makes the determination represented by block 903.

Figure 10:
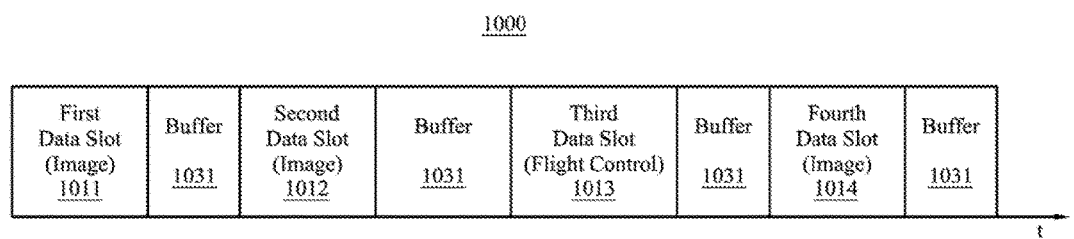
FIG. 10 is an exemplary timeline illustrating an embodiment of a series of data transmissions in accordance with the dynamic time multiple access protocol of FIG. 9.

FIG. 10 illustrates an example of the dynamic time division multiple access protocol 900 (shown in FIG. 9). In FIG. 10, there are four data time slots 1011-1014. There are also four buffer slots 1031.

The buffer slots 1031 advantageously enable the UAV 110 (shown in FIG. 1) to alert the ground terminal 120 (shown in FIG. 1) that the UAV 110 seeks to transmit a UAV-GT data transmission 130B (shown in FIG. 1) to the ground terminal 120. The buffer slots 1031 also allow the ground terminal 120 to alert the UAV 110 via a permission signal sent through the wireless channel 130 (shown in FIG. 1) that the UAV 110 has permission to send a UAV-GT data transmission 130B corresponding to its highest-priority signal.

In the example of FIG. 10, the first signal to be transmitted is a UAV-GT data transmission 130B with an image from the UAV 110. The UAV 110 occupies the wireless channel 130 and transmits the UAV-GT data transmission 130B with image data in the first data slot 1011. The UAV 110 also transmits a UAV-GT data transmission 130B with image data in the second data slot 1012 as well. But before the third data slot 1013 occurs, the ground terminal processor 112 (shown in FIG. 3) receives flight controls from the user interface 124 (shown in FIG. 3). In this example, flight controls have higher priority than image data, so the flight control request is placed into the dynamic request buffer 800 (shown in FIG. 8) in the first entry 801, and the image request is moved into the second entry 802. Consequently, during the third data slot 1013, the ground terminal 120 transmits a GT-UAV data transmission 130 with flight control data to the UAV 110. Once the transmission is complete in the data slot 1013, the flight control request at entry one 801 of the dynamic request buffer 800 is flushed and the image transmission request from the second entry 802 is moved to the first entry 801. Once the flight control data has completed transmitting, the UAV 110 resumes transmitting the image data in the fourth data slot 1014. In some embodiments, the time duration of the buffer slots 1031 are not as long as the time duration of the data slots 1011-1014.

For certain signals, the UAV 110 or the ground terminal 120 can transmit data through the wireless channel 130 using an Acknowledgment protocol, sometimes referred to as an ACK protocol. An ACK protocol improves the reliability of the transmission signal 130 by requiring the data recipient to send an acknowledgment signal that confirms receipt of the data. However, the acknowledgment process of the ACK protocol can result in delay. Thus, it is not desirable to transmit all signals between the UAV 110 and ground terminal 120 using the ACK protocol. An alternative to the ACK protocol is a real-time non-acknowledgment (rt-nACK) protocol, in which an acknowledgment signal is not sent by the data recipient, resulting in reduced latency. Determining whether or not to use an ACK protocol depends on the type of data transmitted and the desired tradeoff of reliability versus latency. As a non-limiting example, data that is continuously changing or high-low changing may not require use of an ACK protocol.

FIG. 11 illustrates an exemplary ACK protocol timeline 1100 illustrating an ACK protocol used in the exemplary embodiment. In the example of FIG. 11, flight control data time slots 1101 are allocated to the around terminal 120 to transmit flight control data to the UAV 110. Image data time slots 1102 are allocated to the UAV 110 to transmit image data to the ground terminal 120. There are also sensor/ACK data time slots 1103 for the UAV 110 to transmit a UAV-GT data transmission 130B to the ground terminal 120. During the sensor/ACK data time slots 1103, the UAV 110 may transmit either sensor data from the sensor 115, or it may transfer an ACK signal to the ground terminal 120. The sensor data provides the ground terminal 120 valuable feedback about the speed, position, and trajectory of the UAV 110. The UAV 110 transmits an ACK signal if it successfully receives a transmission from the ground terminal 120 that uses an ACK protocol. For example, if a flight control signal is transmitted using an ACK, protocol and the UAV 110 successfully receives the flight control signal during the second flight control data slot 1101, the UAV 110 transmits an ACK signal during the following sensor/ACK data time slot 1103.

Figure 12:
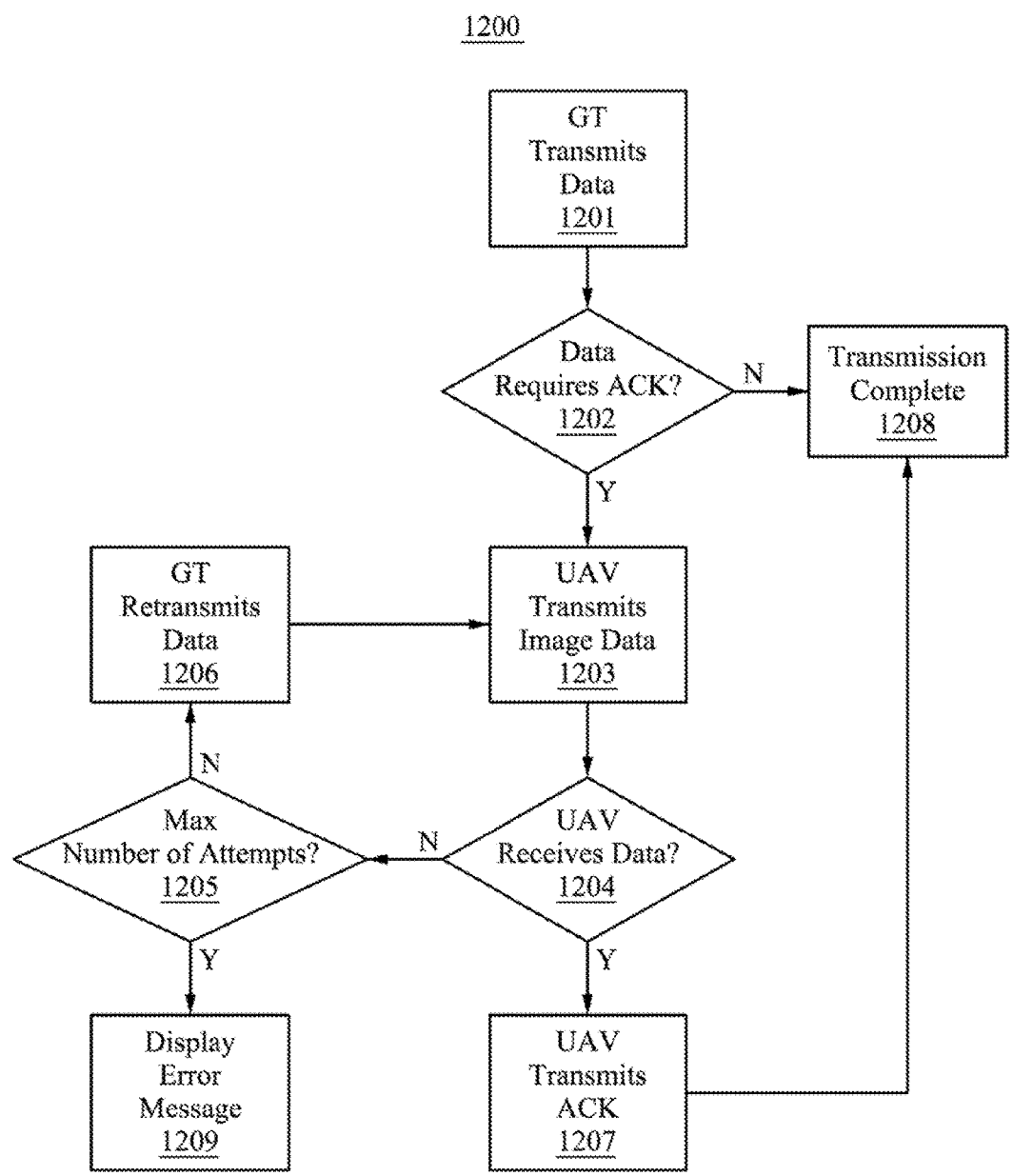
FIG. 12 is an exemplary flow chart illustrating a process for selectively implementing an ACK protocol for a signal transmitted from the ground terminal to the UAV of FIG. 1.

FIG. 12 illustrates the operation of a process for selectively implementing an ACK protocol 1200. In this example, the ground terminal 120 uses the ACK protocol to transmit certain GT-UAV signal transmissions 130A. Block 1201 represents the ground terminal 120 transmitting a GT-UAV data transmission 130A having flight control data, for example, during flight control data time slot 1101 (shown in FIG. 11). The ground terminal 120 determines whether to transmit the flight control data using the ACK protocol, represented by block 1202. Although block 1202 in FIG. 12 is represented as occurring after block 1201, the ground terminal 120 may alternatively determine whether to use the ACK protocol before transmitting the flight control data or at the same time as the ground terminal 120 transmits the flight control data. If the flight control data does not use the ACK protocol, then the ACK protocol terminates, in 1208.

After the ground terminal 120 transmits the flight control data, the UAV 110 transmits image data, if it has any to transmit. This transmission may occur during an image data time slot 1102 (shown in FIG. 11). If the UAV 110 successfully receives the flight control data transmission, in block 1204, then the UAV 110 transmits an ACK signal in response, in 1207, after which the protocol terminates, in 1208. The UAV 110 can transmit the ACK signal during a sensor/ACK data time slot 1103 (shown in FIG. 11).

If the UAV 110 does not successfully receive the flight control data transmission and the ground terminal 120 does not receive an ACK signal, then the ground terminal 120 determines how many attempts it has made to send the flight control data, and compares that to a maximum number of attempts, in block 1205. This comparison can be done in software by the ground terminal processor 122. Alternatively it can be done in hardware by, for example, a counter and a comparator.

If the maximum number of attempts has been reached, then the UAV 110 can display an error message at the ground terminal 120, indicating that the flight control data was unsuccessful, in block 1209. If the maximum number of attempts has not been reached, then the ground terminal 120 re-transmits the flight control data, in block 1206, and then new image data is transmitted, in block 1203 (image data is not re-transmitted). The flight control data is re-transmitted until either the flight control data is successfully received by the UAV 110 (which will result in the UAV 110 transmitting an ACK signal), or the maximum number of attempts has been reached, whichever occurs first.

In some embodiments, the UAV 110 and the ground terminal 120 do not always use an ACK protocol when transmitting data. For some signals, an ACK protocol can be used when transmitting data. When configuring the camera, for example, the camera configuration control signals the ground terminal 120 sends can be sent using the ACK protocol. Similarly, when updating the GPS home point to the user's location, the update GPS home point to the user's location signal the ground terminal sends can be sent using the ACK protocol. Also certain control signals, such as a signal setting the maximum altitude for the UAV 110, are advantageously sent using an ACK protocol.

But for other signals, the data signals are usually not transmitted using the ACK protocol. For example, the flight control signals that control the movement of the UAV 110 can be sent from the ground terminal 120 without using an ACK protocol. The signals to toggle on and off the landing assistance feature or assisted take-off feature similarly can be sent without using an ACK protocol. Likewise, the signals to take a picture or record a video can be sent without using an ACK protocol.

Many parameters determine whether it is advantageous to send a transmission signal via an ACK protocol, including how frequently the signal is sent, the size of the signal, and how critical the signal is to the safe operation of the UAV 110.

One way to send only some signals using the ACK table is to use a look-up table 1300. A look-up table 1300 can be created in the ground terminal memory 126 (shown in FIG. 3) or the UAV memory 116 (shown in FIG. 2) or both by software. Alternatively, the ground terminal 120 or the UAV 110 or both can have a dedicated hardware look-up table 1300. The look-up table 1300 can also be provided from an external source, such as through an external memory device coupled to the ground terminal 120. In another embodiment, whether to transmit a signal via the ACK protocol can be determined by non-memory hardware within the ground terminal 120 and/or UAV 110. The signal itself can have an ACK bit encoded within it that indicates whether to use an ACK protocol. For example, combinational logic and/or multiplexers and/or demultiplexers can be used to route a signal or signals through a particular hardware path or paths. An ACK control signal, which can be located within the data signal to be transmitted, can be used as a select signal to control the multiplexers and demultiplexers.

Figure 13:
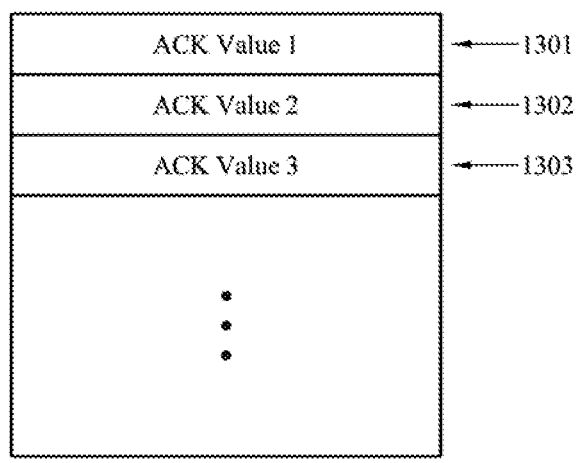
FIG. 13 is an exemplary look-up table illustrating an embodiment of an ACK look-up table for the processes described in FIGS. 11 and 12.

FIG. 13 illustrates a look-up table 1300 for determining whether to send a given signal using the ACK protocol. The look up table 1300 has multiple entries. Each entry, for example, entry one 1301, stores whether a particular type (or types) of signals should be transmitted using the ACK protocol. The look-up table 1300 can be one-bit wide, meaning that each entry has only one bit of storage. Alternatively, the look-up table 1300 can contain more detailed information about each particular signal, meaning that the look-up table is longer than one bit wide. Generally, when only two wireless protocols are used, only one bit is needed to store whether a particular signal should be sent using the ACK protocol, and that bit is called the ACK bit. Where more than two wireless transmission protocols are used, however, multiple ACK bits are needed.

The information describing a particular signal may extend across several entries in the look-up table 1300. For example, if a look-up table 1300 is 8 bits wide, and each type of data signal to be transmitted has sixteen status bits, then two rows of the look-up table 1300, for example entry one 1301 and entry two 1302, are used to store information about each data signal type.

Figure 14:
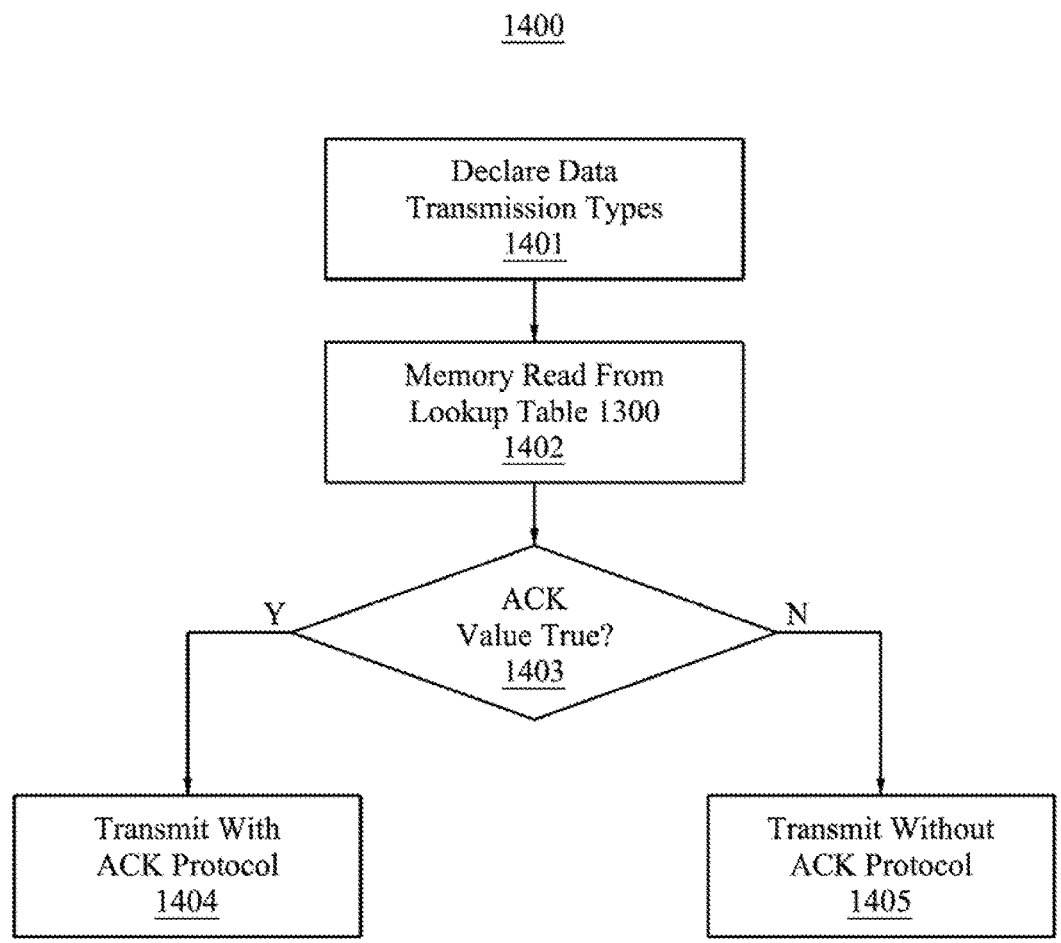
FIG. 14 is an exemplary flow chart illustrating an embodiment of a method for determining whether to transmit the transmission signal of FIG. 1 via the ACK protocol described in FIGS. 11 and 12.

FIG. 14 illustrates an exemplary process 1400 for determining whether to transmit a signal using the ACK protocol. Block 1401 represents creating the look-up table 1300 (shown in FIG. 13) in both the ground terminal memory 126 (shown in FIG. 3) and the UAV memory 116 (shown in FIG. 2) and populating the look-up table 1300 with status information describing the possible signals the UAV 110 (shown in FIG. 1) and the ground terminal 120 (shown in FIG. 1) can exchange. The look-up table 1300 can be populated via a non-volatile memory. The look-up table 1300 can alternatively be populated by the ground terminal processor 122 (shown in FIG. 3) and/for the UAV processor 122 (shown in FIG. 2). The look-up table 1300 includes one or more ACK bits.

When the ground terminal 120 has data to wirelessly transmit, the ground terminal processor 122 performs a read command at the look-up table 1300 within the ground terminal memory 126 at the memory address corresponding to the signal to be transmitted. Block 1402 represents this memory read. The ground terminal processor 122 then analyzes the ACK bit from the look-up table 1300, represented by block 1403. If the ACK bit is "high," then the ground terminal 120 will ultimately transmit the data using the ACK protocol, represented by block 904. If the ACK bit is "low," then the data is to be transferred without using the ACK protocol, that is, by merely transmitting the data through the wireless channel 130. Block 1405 represents transmitting the transmission signal 130 without using an ACK protocol.

Figure 15:
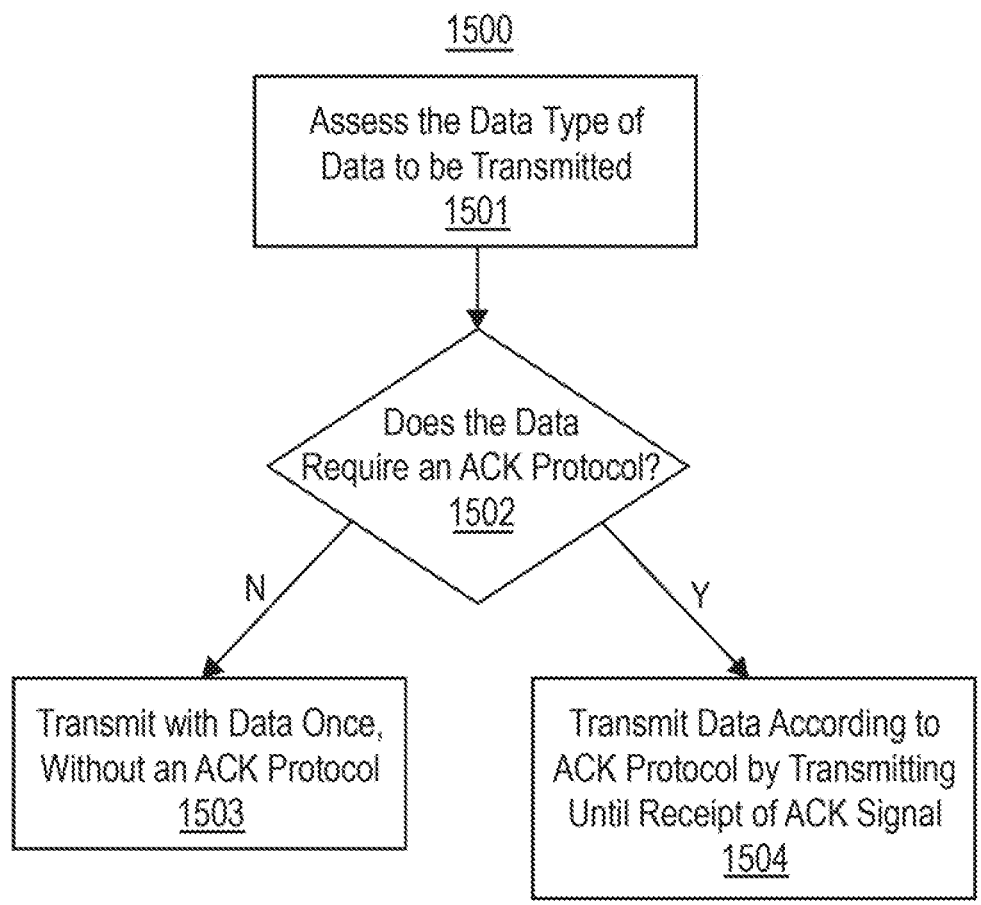
FIG. 15 is an exemplary flow chart illustrating a process for selectively implementing an ACK protocol, from the perspective of the ground terminal of FIG. 1.

FIG. 15 illustrates a process 1500 for implementing an ACK protocol, from the perspective of the ground terminal 120. The ground terminal 120 assesses the data type of the data to be transmitted, at 1501. The ground terminal 120 determines whether the data is to be transmitted by an ACK protocol, at 1502. If no ACK protocol is necessary, then the ground terminal 120 simply transmits the data a single time through the wireless channel 130, at 1503. If the data is to be transmitted via an ACK protocol, however, then the ground terminal 120 transmits the data through the wireless channel 130 according to an ACK protocol, at 1504. The ground terminal 120 re-transmits the data as many times as necessary until the UAV 110 transmits an acknowledgment signal to the around terminal 120, indicating the UAV 110 successfully received the data. It is advantageous to not use an ACK protocol for data such as takeoff assist, landing assist, flight control, and reset control signals. It is advantageous to use an ACK protocol for data such as camera setting signals and other configuration signals, such as maximum flight altitude or distance data.

Figure 16:
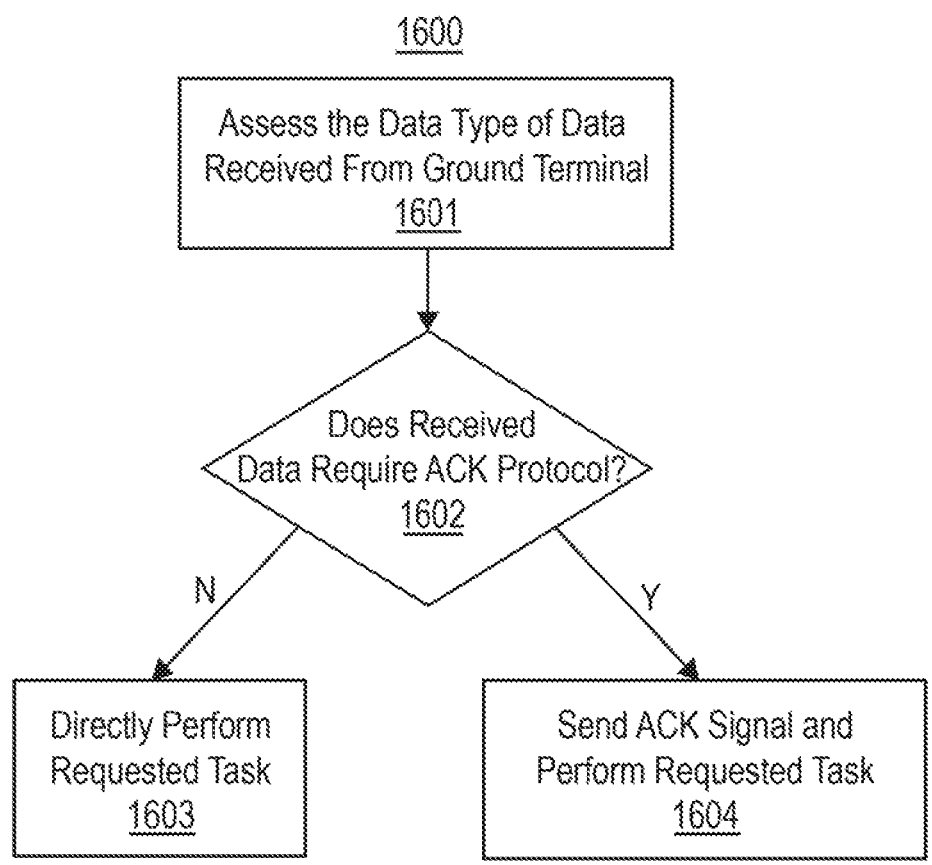
FIG. 16 is an exemplary flow chart illustrating a process for selectively implementing an ACK protocol, from the perspective of the unmanned aerial vehicle of FIG. 1.

FIG. 16 illustrates a process 1600 for implementing an ACK protocol, from the perspective of the UAV 110. The UAV 110 receives data from the ground terminal 120 and assesses the data type of the transmitted data, at 1601. The UAV 110 determines whether the data is required to be transmitted by an ACK protocol, at 1602. If no ACK protocol is necessary, then the UAV 110 simply performs the task requested by the ground terminal 120, at 1603. If the data is transmitted via an ACK protocol, however, then the UAV 110 at 1604 transmits an acknowledgment signal to the ground terminal 120, indicating the UAV 110 successfully received the data, and performs the task requested by the ground terminal 120. It is advantageous to not use an ACK protocol for data such as takeoff assist, landing assist, flight control, and reset control signals. It is advantageous to use an ACK protocol for data such as camera setting signals and other configuration signals, such as maximum flight altitude or distance data. Additionally, the UAV processor 112 can send a command to a UAV functional module based on the received GT-UAV transmission 130A. In some embodiments, the UAV processor 112 does so in response to determining that the GT-UAV data is not transmitted according to the ACK protocol.

In one embodiment the system breaks up the image data into small slices to increase the likelihood of successful transmissions. Upon receipt, the ground station reassembles the slices of image data. For example, image data can be transferred over the course of multiple time slots, as described, for example, in FIGS. 7, 10, and 11.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for communicating ground terminal-to-unmanned aerial vehicle (GT-UAV) data to an unmanned aerial vehicle (UAV) from a ground terminal, wherein the GT-UAV data is transmitted one or more times to the UAV, comprising:
   receiving the GT-UAV data over a wireless channel;
   transmitting UAV image data to the ground terminal over the wireless channel;
   determining whether the received GT-UAV data is transmitted according to an Acknowledgment (ACK) protocol; and
   transmitting an acknowledgment signal over the wireless channel to the ground terminal in response to the received GT-UAV data being determined to be transmitted according to the ACK protocol,
   wherein the GT-UAV data are sent according to the ACK protocol when the GT-UAV data is at least one of a camera setting data, a maximum flight altitude data, or a maximum flight distance data.

2. The method of claim 1, further comprising attempting to receive the GT-UAV data, and upon making an unsuccessful attempt, again attempting to receive the GT-UAV data.

3. The method of claim 1, further comprising determining a status of the UAV and transmitting the status to the ground terminal.

4. The method of claim 3, wherein the status indicates whether the UAV is behaving normally or abnormally.

5. The method of claim 1, further comprising determining a status of one or more UAV functional modules and transmitting data regarding the status to the ground terminal.

6. The method of claim 5, wherein the status indicates whether the UAV functional module is behaving normally or abnormally.

7. The method of claim 1, further comprising sending a command to a UAV functional module based on the GT-UAV data in response to determining that the GT-UAV data is not transmitted according to the ACK protocol.

8. The method of claim 1, further comprising determining that the GT-UAV data is not sent according to the ACK protocol when the GT-UAV data is at least one of a flight control data, a takeoff assist data, a landing assist data, or a reset control data.

9. A method for communicating ground terminal-to-unmanned aerial vehicle (GT-UAV) data to an unmanned aerial vehicle (UAV) from a ground terminal, comprising:
   determining whether to transmit the GT-UAV data according to an Acknowledgment (ACK) protocol;
   in response to determining to transmit the GT-UAV data according to the ACK protocol, transmitting the GT-UAV data one or more times to the UAV according to the ACK protocol until the ground terminal receives an acknowledgment signal from the UAV over a wireless channel;
   receiving UAV image data from the UAV over the wireless channel; and
   receiving the acknowledgment signal from the UAV in response to the GT-UAV data being sent according to the ACK protocol and being received by the UAV over the wireless channel;
   wherein the GT-UAV data are ent according to the ACK protocol when the GT-UAV data is at least one of a camera setting data, a maximum flight altitude data, or a maximum flight distance data.

10. The method of claim 9, further comprising determining to not transmit the GT-UAV data according to the ACK protocol, and transmitting the GT-UAV data one time to the UAV.

11. The method of claim 9, further comprising receiving a status signal from the UAV indicating a status of the UAV.

12. The method of claim 11, wherein the status signal indicates whether the UAV is behaving normally or abnormally.

13. The method of claim 9, further comprising receiving a status signal from the UAV indicating a status of a UAV functional module.

14. The method of claim 13, wherein the status signal indicates whether the UAV functional module is behaving normally or abnormally.

15. The method of claim 9, further comprising sending the GT-UAV data not according to the ACK protocol when the GT-UAV data is at least one of a flight control data, a takeoff assist data, a landing assist data, or a reset control data.

16. An unmanned aerial vehicle (UAV), comprising:
a transceiver configured to receive ground terminal-to-unmanned aerial vehicle (GT-UAV) data from a ground terminal over a wireless channel, and to send image data to the ground terminal over the wireless channel; and
a processing system coupled to the transceiver and configured to determine whether the GT-UAV data transmission is sent according to an ACK protocol and to generate an acknowledgment signal,
wherein the ACK protocol comprises the ground terminal transmitting GT-UAV data according to the ACK protocol one or more times until the transceiver successfully receives the GT-UAV data, the processing system determining the GT-UAV data is sent according to the ACK protocol when the GT-UAV data is at least one of a camera setting data, a maximum flight altitude data, or a maximum flight distance data, and the transceiver transmitting the acknowledgment signal to the ground terminal in response to the GT-UAV data being sent according to the ACK protocol.

17. The unmanned aerial vehicle of claim 16, wherein the processing system is further configured to create status information about a functional module and the transceiver is further configured to transmit the status information to the ground terminal.

18. The unmanned aerial vehicle of claim 16, wherein the transceiver is further configured to receive from the ground terminal a command signal for controlling a functional module and the processing system is further configured to interpret the command signal.

* * * * *